(12) United States Patent
Ohlsson et al.

(10) Patent No.: US 11,140,716 B2
(45) Date of Patent: Oct. 5, 2021

(54) NETWORK NODE AND METHODS FOR DETERMINING SUCCESS OF A RANDOM ACCESS PROCEDURE

(71) Applicant: Telefonaktiebolaget LM Ericsson (publ), Stockholm (SE)

(72) Inventors: Oscar Ohlsson, Stockholm (SE); Béla Rathonyi, Lomma (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/339,043

(22) PCT Filed: Oct. 9, 2017

(86) PCT No.: PCT/SE2017/050982
§ 371 (c)(1),
(2) Date: Apr. 3, 2019

(87) PCT Pub. No.: WO2018/070916
PCT Pub. Date: Apr. 19, 2018

(65) Prior Publication Data
US 2020/0045741 A1 Feb. 6, 2020

Related U.S. Application Data

(60) Provisional application No. 62/406,034, filed on Oct. 10, 2016.

(51) Int. Cl.
*H04W 74/00* (2009.01)
*H04W 74/08* (2009.01)
(Continued)

(52) U.S. Cl.
CPC ..... *H04W 74/0833* (2013.01); *H04W 72/042* (2013.01); *H04W 74/02* (2013.01); *H04W 76/11* (2018.02); *H04W 80/02* (2013.01)

(58) Field of Classification Search
CPC . H04W 74/0833; H04W 80/02; H04W 74/02; H04W 72/042; H04W 76/11
See application file for complete search history.

(56) References Cited

U.S. PATENT DOCUMENTS

2011/0256879 A1* 10/2011 Chun ............... H04L 1/1819
455/450
2013/0279412 A1 10/2013 Webb et al.
(Continued)

OTHER PUBLICATIONS

3GPP TSG-RAN WG2 ,Oct. 2011, R2-1155156, Random Access Response in multiple TA.*
(Continued)

*Primary Examiner* — Lakeram Jangbahadur
(74) *Attorney, Agent, or Firm* — Sage Patent Group (57) ABSTRACT

Method performed by a network node in communication with a first wireless device. The network node and the first wireless device operate in a wireless communications network. The network node determines whether or not a random access procedure for the first wireless device was successful. The determining is performed after the following actions in the random access procedure: a) a first Physical Downlink Control Channel, PDCCH, order indicating a non-reserved signal has been sent to the first wireless device, the signal being one of: a preamble, a tone and a subcarrier, and b) an L2/L3 message has been received after the sending of the first PDCCH order. The determining is based on verifying whether or not the L2/L3 message originated in the first wireless device.

13 Claims, 5 Drawing Sheets

(51) Int. Cl.
*H04W 76/11* (2018.01)
*H04W 72/04* (2009.01)
*H04W 74/02* (2009.01)
*H04W 80/02* (2009.01)

(56) References Cited

U.S. PATENT DOCUMENTS

| | | | | |
|---|---|---|---|---|
| 2014/0092855 A1* | 4/2014 | Ahn | ................... | H04W 74/006 |
| | | | | 370/329 |
| 2015/0036525 A1* | 2/2015 | Aiba | ...................... | H04B 1/713 |
| | | | | 370/252 |
| 2015/0085689 A1 | 3/2015 | Vos | | |
| 2016/0056933 A1* | 2/2016 | Aiba | ................. | H04W 72/0406 |
| | | | | 370/329 |
| 2016/0057743 A1* | 2/2016 | Aiba | ................. | H04W 72/0406 |
| | | | | 370/329 |
| 2017/0374686 A1* | 12/2017 | Agarwal | ............. | H04W 72/085 |
| 2019/0327012 A1* | 10/2019 | Park | ....................... | H04W 24/08 |

OTHER PUBLICATIONS

3GPP TS 36.321 v14.0.0, Sep. 2016, 3rd Generation Partnership Project; Technical Specification Group Radio Access Network; Evolved Universal Terrestrial Radio Access (E-UTRA); Medium Access Control (MAC) protocol specification (Release 14).*
International Search Report and Written Opinion of the International Searching Authority, PCT/SE2017/050982, dated Dec. 20, 2017, 10 pages.
3GPP TSG-RAN WG2 #75bis, Random Access Response in multiple TA, Research in Motion, UK Limited, Zhuhai, China, Oct. 10-14, Oct. 2011, Tdoc R2-115156, 6 Pages.
Supplementary European Search Report for European Application No. EP 17 86 1087 dated Jul. 25, 2019, 2 pages.
3GPP TS 36.321 V14.0.0 (Sep. 2016), 3rd Generation Partnership Project; Technical Specification Group Radio Access Network; Evolved Universal Terrestrial Radio Access (E-UTRA); Medium Access Control (MAC) protocol specification (Release 14), Retrieved on Oct. 3, 2016, XP051172893 pp. 1-96.
3GPP TS 36.213, V14.0.0 (Sep. 2016), "3rd Generation Partnership Project; Technical Specification Group Radio Access Network; Evolved Universal Terrestrial Radio Access (E-UTRA); Physical layer procedures (Release 14)," Sep. 29, 2016, 406 pages.
3GPP TS 36.331, V14.0.0 (Sep. 2016), "3rd Generation Partnership Project; Technical Specification Group Radio Access Network; Evolved Universal Terrestrial Radio Access (E-UTRA); Radio Resource Control (RRC); Protocol specification (Release 14)," Oct. 4, 2016, 644 pages.

* cited by examiner

NETWORK NODE AND METHODS FOR DETERMINING SUCCESS OF A RANDOM ACCESS PROCEDURE

CROSS REFERENCE TO RELATED APPLICATIONS

This application is a 35 U.S.C. § 371 national stage application of PCT International Application No. PCT/SE2017/050982 filed on Oct. 9, 2017, which in turn claims domestic priority to U.S. Provisional Patent Application No. 62/406,034, filed on Oct. 10, 2016, the disclosures and content of which are incorporated by reference herein in their entirety.

TECHNICAL FIELD

The present disclosure relates generally to a network node and methods performed thereby for handling a random access procedure. The present disclosure further relates to a computer program product, comprising instructions to carry out the actions described herein, as performed by the network node. The computer program product may be stored on a computer-readable storage medium.

BACKGROUND

Communication devices within a wireless communications network may be wireless devices such as e.g., User Equipments (UE), mobile terminals, wireless terminals, terminals, and/or Mobile Stations (MS). Wireless devices are enabled to communicate wirelessly in a cellular communications network or wireless communications network, sometimes also referred to as a cellular radio system, cellular system, or cellular network. The communication may be performed e.g. between two wireless devices, between a wireless device and a regular telephone, and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a communication device which may be an access node such as a base station, e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Internet of Things (IoT)

The Internet of Things (IoT) may be understood as an internetworking of communication devices, e.g., physical devices, vehicles, which may also referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use Wi-Fi for remote monitoring. These devices may collect data with the help of various existing technologies and then autonomously flow the data between other devices.

Narrow Band Internet of Things (NB-IoT)

NB-IoT is a narrowband system developed for cellular IoT by 3GPP. The system is based on existing LTE systems and addresses optimized network architecture and improved indoor coverage for a massive number of devices which may have following characteristics: low throughput devices, e.g., 2 kilobytes per second (kbps), low delay sensitivity, e.g., approximately 10 seconds, ultra-low device cost, e.g., below 5 dollars, and low device power consumption, e.g., battery life of 10 years.

It is envisioned that each cell, e.g., 1 km$^2$, in this system may in the future serve thousands, e.g., 50000 devices, such as sensors, meters, actuators, and alike.

NB-IoT may operate on a 200 kiloHertz, kHz, carrier and use a physical layer design similar to LTE. In particular, the modulation technique, Orthogonal Frequency Division Multiple Access (OFDM) in DL and Single-Carrier Frequency Division Multiple Access (SC-FDMA) in uplink, frame structure and subcarrier spacing may remain the same. Also, the Layer 2 (L2) and Layer 3 (L3) in NB-IoT, which may be collectively referred to herein as L2/L3, may be very similar to their counterpart in LTE.

Random Access in NB-IoT

The main purpose of the random access procedure may be understood as to achieve uplink synchronization and assign a unique identifier, a Cell Radio Network Temporary Identifier (C-RNTI), to the UE. In LTE and NB-IoT, random access may be used in several scenarios, including: a) at transition from Radio Resource Control (RRC)_IDLE state to RRC_CONNECTED, for example for initial access or tracking area updates, b) recovering from radio link failure, c) a UE in RRC_CONNECTED needing to send new uplink data or control information, e.g., Scheduling Request (SR)/ Buffer Status Report (BSR) triggered, d) a UE in RRC_CO-NNECTED state, but not uplink-synchronized, needing to send new uplink data or control information, e.g., SR/BSR triggered, e) a UE in RRC_CONNECTED state, but not uplink-synchronized, needing to receive new downlink data, and therefore to transmit a corresponding ACKnowledgment/Negative ACKnowledgment (ACK/NACK) in the uplink, f) for positioning purposes in RRC_CONNECTED state, when timing advance may be needed for UE positioning.

The random access procedure may be either contention based, implying an inherent risk of collision, if more than one UE simultaneously transmit the same preamble, or contention-free. This is explained in the following sections.

Contention Based Random Access Procedure

Figure 1:
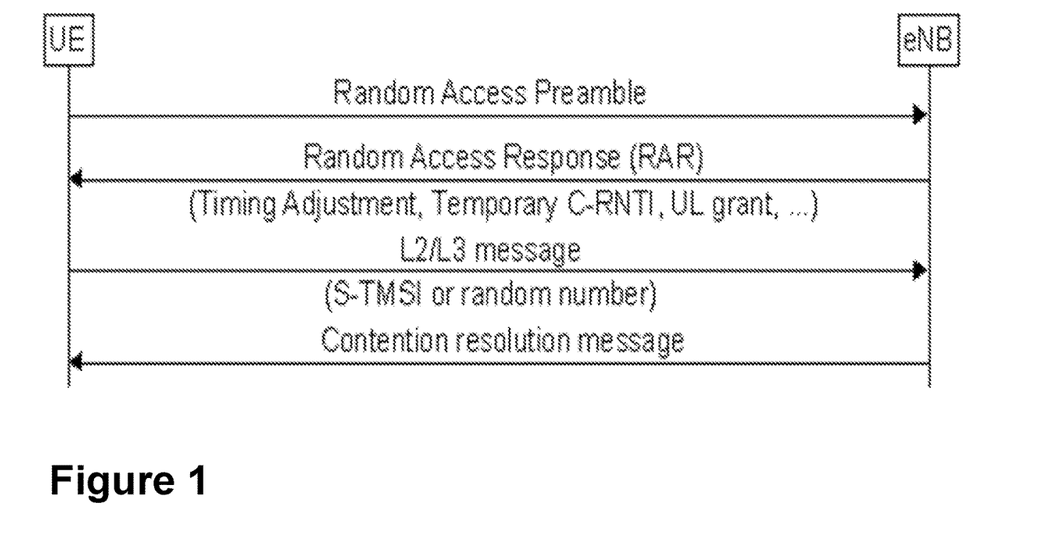
FIG. 1 is a schematic diagram illustrating an example of a contention based random access procedure.

A UE may initiate a contention based random access procedure for all scenarios listed above, except the last two. A schematic diagram summarizing the contention based random access procedure in LTE is shown in FIG. 1. In this procedure, a random access preamble may be randomly chosen by the UE, which may result in more than one UE simultaneously transmitting the same preamble, leading to a need for a subsequent contention resolution process. A preamble, is a type of signal that may be used in the random access procedure in LTE, contention based or contention-free. However, the random access procedure in other systems, e.g., in NB-IoT, may use a different signal, e.g., a tone, which may perform a similar function in the random access procedure in NB-IoT.

In a first step, the UE may randomly select a preamble from the set of contention based preambles and transmit this on the Random Access Channel (RACH). The preamble transmission may allow the eNB to detect the presence of the UE and estimate the delay between the eNB and UE. The delay estimate may then be used in the second step to adjust the uplink timing.

In a second step, the eNB may respond with a Random Access Response (RAR) comprising: a) the index of the random-access preamble the network detected and for which the response is valid, b) the Timing Advance (TA) calculated by the random access preamble receiver and which may be used for uplink synchronization, c) a scheduling grant, indicating resources the UE may use for the transmission of the message in the third step and d) a temporary identity, the Temporary C-RNTI, used for further communication between the terminal and the network.

In a third step, the terminal may respond with a L2/L3 message, which comprises the UE identity which may be used for contention resolution in the fourth step, e.g., a valid C-RNTI or a System architecture evolution Temporary Mobile Subscriber Identity (S-TMSI) may be included in the L2/L3 message if it is available, otherwise a random number may be used as UE identifier. The L2/L3 message may be transmitted on the Physical Uplink Shared CHannel (PUSCH) using the uplink resources indicated in the uplink grant in RAR. Similar to regular PUSCH transmissions, UE-specific scrambling may be applied to the PUSCH transmission to randomize interference between cells. However, since the UE has not been assigned its final identity at this stage, the scrambling may not be based on C-RNTI. Instead, the Temporary C-RNTI may be used.

In a fourth step, the random access procedure may end with the contention resolution in the final message. Note that, from the second step, multiple UEs performing simultaneous random-access attempts using the same preamble in the first step may listen to the same response message in the second step, and therefore, may have the same temporary identifier. Hence, in the fourth step, each UE receiving the downlink message may compare the identity in the message with the identity transmitted in the third step. Only a UE which observes a match between the identity received in the fourth step and the identity transmitted as part of the third step may declare the random access procedure successful.

Contention-Free Random Access

Figure 2:
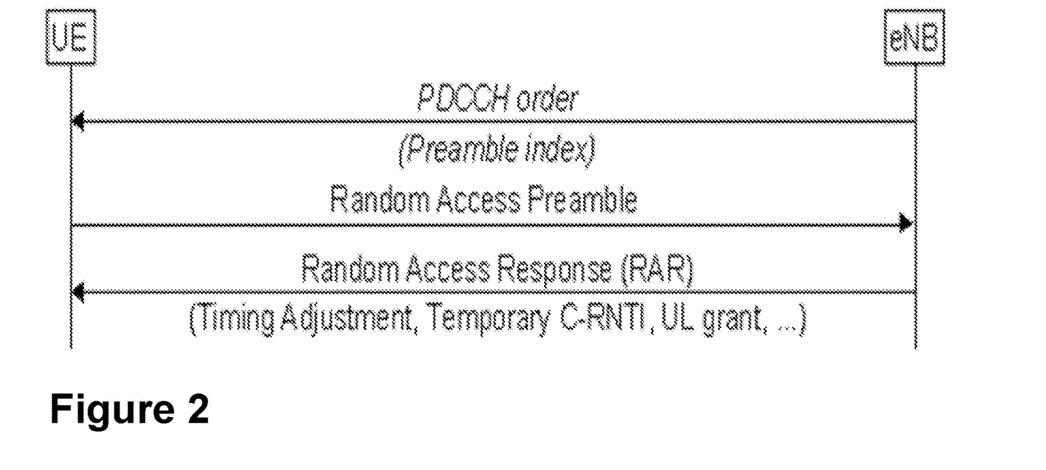
FIG. 2 is a schematic diagram illustrating an example of a contention-free random access procedure.

Contention-free random access may be used for re-establishing uplink synchronization in case of downlink data arrival, and for positioning, i.e. the last two scenarios listed above. These two scenarios are eNB triggered, which means that the eNB may send a PDCCH order with a reserved preamble, A schematic diagram summarizing the contention-free random access procedure is shown in FIG. 2. In this case, the eNB may assign a reserved preamble to the UE, which means that there is no need for contention resolution and the procedure is finished after RAR, i.e. after the second step above. The reserved preamble may be assigned by the eNB using a special downlink message called Physical Downlink Control CHannel (PDCCH) order, which may indicate the index of the preamble to use. The eNB may also trigger a contention based random access by setting the preamble index to 0 in the PDCCH order.

Note that a Temporary C-RNTI may be received in RAR also in the contention-free random access procedure. However, this identifier may be simply discarded by the UE and instead it may use the C-RNTI that it may have already been assigned, as the UE is in RRC_CONNECTED. Also, the UL grant included in the RAR may be be used by the UE, but as the resulting transmission is not considered part of the random access procedure, it is not included in FIG. 2. Unlike contention based random access, the uplink transmission may be scrambled with C-RNTI and not with the Temporary C-RNTI.

The L2/L3 message or the L1 transport block comprising the L2/L3 message with which the UE may respond after the second step of the random access procedure, may be referred to as "message 3" (msg3).

While the contention-free random access procedure may avoid the occurrence of collisions between different UEs, as it relies on using a signal, e.g., a preamble, reserved for a particular UE, it may not always be available. The number of random access preambles are limited and reserving preambles for contention-free random access may therefore not always be possible or desired, since it may steal capacity from the contention-based random access.

SUMMARY

It is an object of embodiments herein to improve random access in a wireless communications network.

According to a first aspect of embodiments herein, the object is achieved by a method, performed by a network node. The network node is in communication with a first wireless device. The network node and the first wireless device operate in a wireless communications network. The first network node determines whether or not a random access procedure for the first wireless device was successful. The determining is performed after the following actions in the random access procedure: a) a first PDCCH order indicating a non-reserved signal has been sent to the first wireless device, the signal being one of: a preamble, a tone and a subcarrier, and b) an L2/L3 message has been received after the sending of the first PDCCH order. The determining is based on verifying whether or not the L2/L3 message originated in the first wireless device.

According to a second aspect of embodiments herein, the object is achieved by a network node. The network node is configured to be in communication with the first wireless device. The network node and the wireless device operate in the wireless communications network. The network node is further configured to determine whether or not the random access procedure for the first wireless device was successful. To determine is configured to be performed after the following actions in the random access procedure: a) the first PDCCH order indicating a non-reserved signal has been sent to the first wireless device, the signal being one of: the preamble, the tone and the subcarrier, and b) the L2/L3 message has been received after the sending of the first PDCCH order. To determine is configured to be based on verifying whether or not the L2/L3 message originated in the first wireless device.

According to a third aspect of embodiments herein, the object is achieved by a computer program. The computer program comprises instructions which, when executed on at least one processing circuitry, cause the at least one processing circuitry to carry out the method performed by the network node.

According to a fourth aspect of embodiments herein, the object is achieved by a computer-readable storage medium. The computer-readable storage medium has stored thereon a computer program comprising instructions which, when executed on at least one processing circuitry, cause the at least one processing circuitry to carry out the method performed by the network node.

By the network node determining whether or not the random access procedure for the first wireless device was successful, based on verifying whether or not the L2/L3 message originated in the first wireless device, wherein the first PDCCH order indicates a non-reserved signal to the first wireless device, the network node is enabled to use a faster random access procedure based on the contention-free random access procedure, but without being limited to using a reserved signal, such as a reserved preamble or tone being available. The latency of the random access procedure is thereby reduced, while the network node is still able to manage, e.g., detect and avoid, potential collisions with other wireless devices.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

The contention-free random access procedure may be typically preferred over the contention based random access procedure. Not only may collisions between different wireless devices be achieved with the contention-free random access, but the contention-free random access may be typically faster than the contention based random access. In the contention-free random access procedure, it may be possible for the preamble index in the PDCCH order to also point to one of the non-reserved preambles, i.e. a preamble from the set of contention based preambles. In this case, the UE receiving the PDCCH order will still follow the contention-free random access procedure, even though the random access is no longer "contention-free". That is, the same preamble may be selected by a second UE, which may result in a preamble collision. Currently, there is no method defined that allows the eNB to detect and resolve such collision, and this may result in various unexpected errors. For example, if a collision occurs, the first UE, which performs "contention-free" random access, may apply incorrect timing advance and cause interference to other UEs, since uplink orthogonality is lost. The UE may also not be able to send ACK/NACKs or transmit UL data.

Embodiments herein may be understood to relate to a method for detecting and resolving preamble collisions resulting from the use of non-reserved preamble in a PDCCH order. That is, to preamble collision detection after a PDCCH order in NB-IoT and LTE.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Future radio access ("5G") will support similar or equivalent functionality. Hence, the terms used herein may need to be reinterpreted in view of possible terminology changes in future radio access technologies, such as 5G or younger wireless systems. Similarly, other already existing wireless systems, including, LTE/eMTC, NB-IoT, IoT, may also benefit from exploiting the ideas covered within this disclosure.

Figure 3:
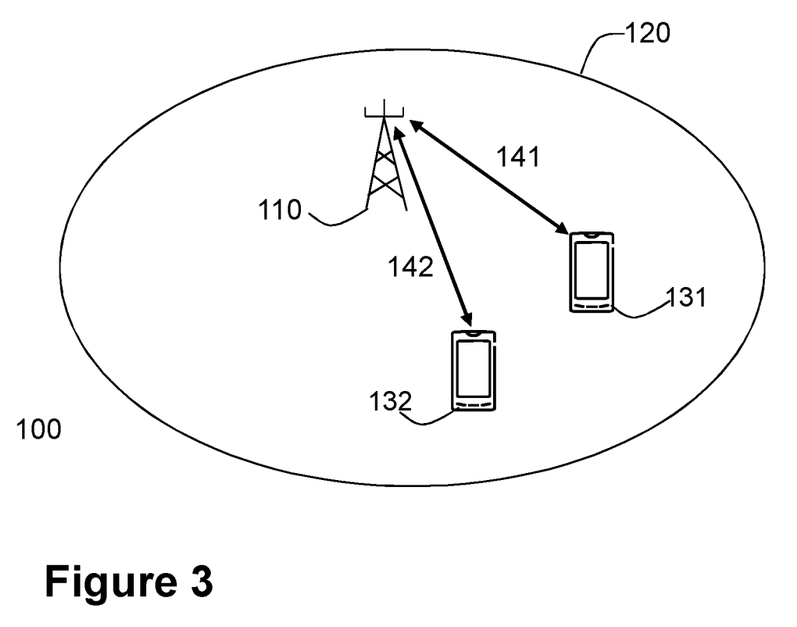
FIG. 3 shows a schematic diagram illustrating an example of a wireless communications network, according to embodiments herein.

FIG. 3 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, enhanced Machine Type Communications (eMTC), NB-IoT, IoT, 5G system or any cellular network or system with similar requirements to those of LTE operating in unlicensed spectrum, such as LTE in Unlicensed Spectrum (LTE-U), also known as standalone-LTE, LAA, MuLTEfire systems. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes whereof the network node 110 is depicted in FIG. 3. The network node 110 may be an access node such as a radio base station, for example an eNB, an eNodeB, or an Home Node B, an Home eNode B, transmission point, or any other network node capable to serve a wireless device, such as a user equipment or a machine type communication device in the wireless communications network 100. The network node 110 may support one or several communication technologies, and its name may depend on the technology and terminology used. In 3GPP LTE, the network node 110, which may be referred to as eNodeB or even eNB, may be directly connected to one or more core networks, which are not depicted in FIG. 3 for the sake of simplicity.

The wireless communications network 100 covers a geographical area, which in some embodiments may be divided into cell areas, wherein each cell area is served by a network node, although, one network node may serve one or several cells. In the non-limiting example depicted in FIG. 3, the network node 110 serves a cell 120. The network node 110 may be of different classes, such as, e.g., macro eNodeB, home eNodeB or pico base station, based on transmission power and thereby also cell size. Typically, the wireless communications network 100 may comprise more cells similar to the cell 120, served by their respective network node. This is not depicted in FIG. 3 for the sake of simplicity. In other examples than those depicted in FIG. 3, wherein the wireless communications network 100 is a non-cellular system, the network node 110 may serve receiving nodes with serving beams. The first communication device 101 may also be implemented in a so-called distributed manner, wherein the actions described herein as being performed by the network node 110 may actually be performed by one or more processors from different nodes communicating in the cloud. This is not represented in FIG. 3 to simplify the Figure.

The wireless communications network 100 comprises a plurality of communication devices, wherein a first wireless device 131 and a second wireless device 132 are depicted in FIG. 3, as being located in the wireless communications network 100. Any of the first wireless device 131 and the second wireless device 132 may also be referred to herein as a user equipment or UE. The wireless device, that is, any of the first wireless device 131 and the second wireless device 132, may be, e.g., a wireless communication device such as a UE which may also be known as e.g., mobile terminal, wireless terminal and/or mobile station, mobile telephone, cellular telephone, or laptop with wireless capability, or any of the "Things" in an IoT system described earlier, just to mention some further examples. The wireless device, that is, any of the first wireless device 131 and the second wireless device 132, may be, for example, portable, pocket-storable, hand-held, computer-comprised, or a vehicle-mounted mobile device, enabled to communicate voice and/or data, via the RAN, with another entity, such as a server, a laptop, a PDA, or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. The wireless device, that is, any of the first wireless device 131 and the second wireless device 132, is enabled to communicate wirelessly in the wireless communications network 100. The communication may be performed e.g., via a RAN and possibly one or more core networks, comprised within the wireless communications network 100.

The first wireless device 131 is configured to communicate within the wireless communications network 100 with the network node 110 over a first radio link 141 in the cell 120. The second wireless device 132 is configured to communicate within the wireless communications network 100 with the network node 110 over a second radio link 142 in the cell 120.

In general, the usage herein of "first", "second", and/or "third", may be understood to be an arbitrary way to denote different elements, and may be understood to not confer a cumulative or chronological character to the nouns they modify.

Embodiments of method performed by a network node 110 in communication with a first wireless device 131, will now be described with reference to the flowchart depicted in FIG. 4. The method may be understood to be for handling a random access procedure or the first wireless device 131. The network node 110 and the wireless device 131 operate in the wireless communications network 100. In particular examples, the wireless communications network 100 may be an LTE network, or a NB-IoT network.

The method may comprise the actions described below. Several embodiments are comprised herein. In some embodiments all the actions may be performed. One or more embodiments may be combined, where applicable. All possible combinations are not described to simplify the description. It should be noted that the examples herein are not mutually exclusive. Components from one embodiment or example may be tacitly assumed to be present in another embodiment or example and it will be obvious to a person skilled in the art how those components may be used in the other exemplary embodiments or examples. In FIG. 4, optional actions are indicated with dashed boxes.

Action 401

In order for the network node 110 to enable the use of the contention-free random access procedure with a signal, e.g., a preamble, that is not reserved, and therefore enable the advantages conferred by the contention-free procedure with a larger number of signals, the collision-free procedure described in FIG. 2 is herein modified to allow for the network node 110 to detect and resolve preamble collisions resulting from the use of a non-reserved signal in the contention-free procedure. This may be understood to be because another wireless device, e.g., the second wireless device 132, may randomly select the same non-reserved signal as that indicated by the network node 110 to the first wireless device 131, to perform, at the same time, a contention-based random access procedure.

According to embodiments herein, the L2/L3 message may be used to detect if the random access is successful after a PDCCH order is sent to the first wireless device 131, or if a preamble collision occurred. The network node 110 may detect if the random access is successful, by verifying that L2/L3 message originated from the correct wireless device, that is, the first wireless device 131.

According to the foregoing, in this Action 401, the network node 110 determines whether or not a random access procedure for the first wireless device 131 was successful. The determining 401 is performed after the following actions in the random access procedure: a) a first PDCCH order indicating a non-reserved signal has been sent to the first wireless device 131, the signal being one of: a preamble, a tone and a subcarrier, and b) an L2/L3 message has been received after the sending of the first PDCCH order. The determining 401 is based on verifying whether or not the L2/L3 message originated in the first wireless device 131, since it may be understood that the network node 110 may no longer be sure the chosen signal was uniquely used by the first wireless device 131.

The random access may be understood as, e.g., the random access procedure in LTE.

The signal may be understood as a radio signal or an indicator. For example, it may be a preamble in LTE, and a tone in NB-IoT, or a subcarrier, that is, a subcarrier in NB-IoT. Equivalent signals or indicators may be understood by one of skill in the art. In NB-IoT, for example, the Physical Random Access Channel (PRACH) signal may be energy transmitted on a specific tone/subcarrier—the terms may be used interchangeably-, and only one UE may be using a tone/subcarrier at a time, unless there is a collision. There may be 48 subcarriers/tones, and the UE may jump between these tones according to a pre-configured pattern at certain time intervals during the transmission to obtain frequency diversity and limit interference between cells. In LTE, the PRACH signal may be transmitted across multiple subcarriers and all UEs may use the same subcarriers. To separate the UEs, an orthogonal coding scheme may be applied where each UE may choose, or may be assigned, one out of 64 different codes. Each of these codes may be called a preamble.

In some examples, the determining, in this Action 401, of whether or not the random access for the first wireless device 131 was successful may be performed after any of the following addition actions in the random access procedure: c) the network node 110 has received a non-reserved random access signal indicated in the first PDCCH order, and d) in response to receiving the non-reserved random access signal, the network node 110 has sent a Random Access Response, RAR, message comprising an uplink grant.

Actions c and d may be performed between actions a and b above. The random access signal, e.g., a random access preamble, random access tone, or random access subcarrier, may be understood to refer to the same non-reserved signal indicated in the first PDCCH order. That is, they may refer to the same preamble or the same tone or the same subcarrier.

The L2/L3 message received after the sending of the first PDCCH order may be based on the uplink grant in d).

Figure 4:
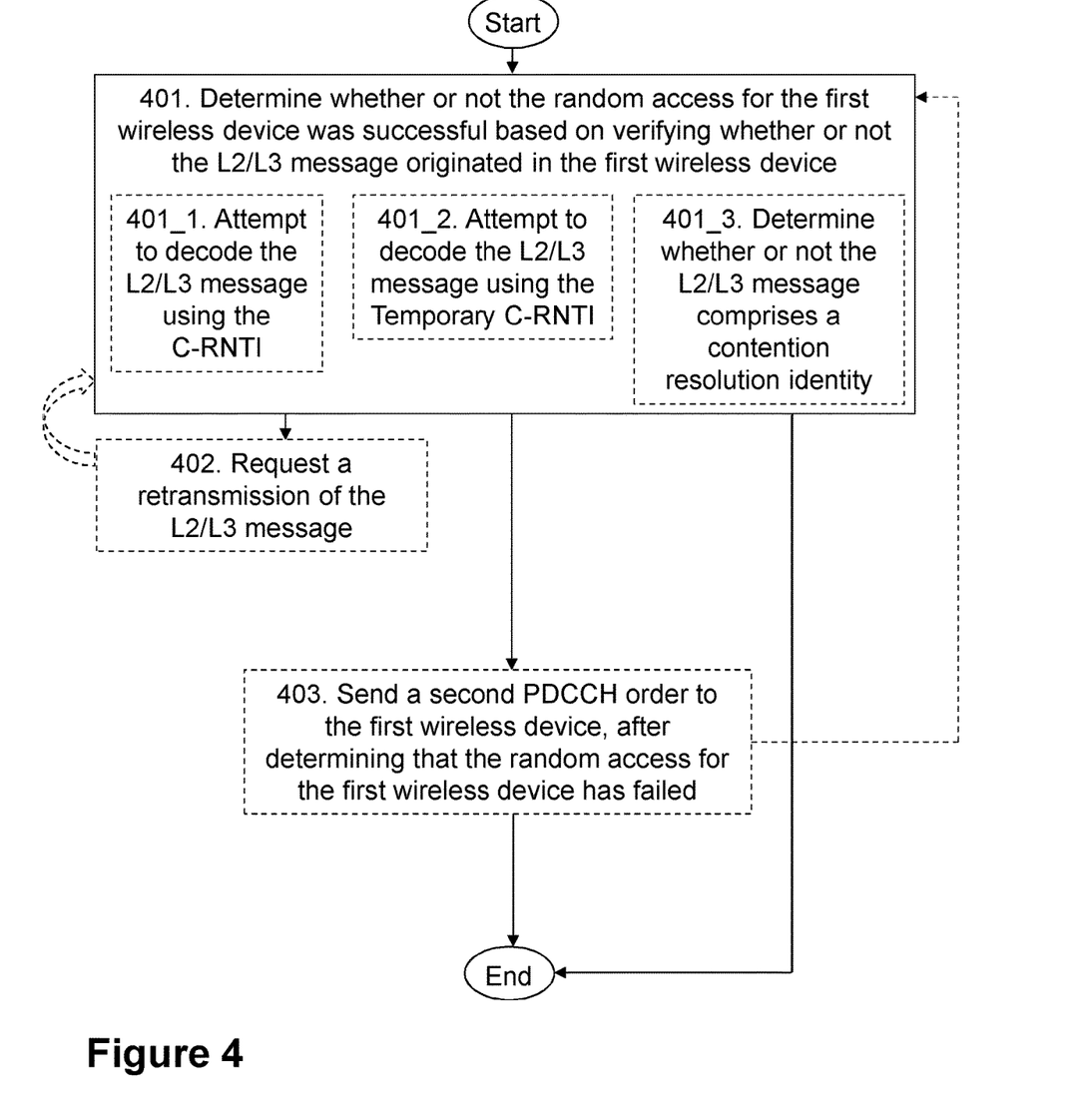
FIG. 4 shows a flowchart illustrating an embodiment of a method in a network node, according to embodiments herein.

The network node 110, after receiving the L2/L3 message may attempt to decode the transmission from the first wireless device 131 in one or more ways, as depicted in FIG. 4 as Actions 401_1, 401_2, and 401_3, which are described next.

Action 401_1. In some embodiments, the verifying whether or not the L2/L3 message originated in the first wireless device 131 may be based on a result, e.g., a first result, of attempting, in Action 401_1, to decode, for one or more attempts, the L2/L3 message using a C-RNTI. The C-RNTI may have been assigned to the first wireless device 131 prior to the first PDCCH order having been sent. The C-RNTI may have been assigned to the first wireless device 131, e.g., during connection establishment, connection re-establishment, connection resume or handover procedure. If the decoding is successful, that is, if the message passes the Cyclic Redundancy Check (CRC) checksum verification, the network node 110 may concludes that the message originated from the first wireless device 131 and that the random access attempt was successful. If decoding fails, the network node 110 may proceed as described below in Action 402.

Action 401_2. In some embodiments, the verifying whether or not the L2/L3 message originated in the first wireless device 131 may be further based on a second result of attempting, in Action 401_2, to decode the L2/L3 message using a Temporary C-RNTI indicated by the network node 110 to the first wireless device 131 in response to receiving the signal from the first wireless device 131. The attempting 401_2 to decode the L2/L3 message using the Temporary C-RNTI may be performed simultaneously to the attempting 401_1 to decode, for the one or more attempts, the L2/L3 message using the C-RNTI.

If, in Action 401_2, the message is scrambled with the Temporary C-RNTI, it means the message originated from the second wireless device 132 and that a preamble collision occurred. The network node 110 may then declare random access failure for the first wireless device 131 directly and proceed to Action 403, instead of waiting until the maximum number of HARQ re-transmissions has been reached.

Action 401_3. Alternatively to Actions 401_1 and 401_2, instead of using the scrambling sequence to determine which wireless device the L2/L3 message originated from, the network node 110 may look at the contents of the L2/L3 message. Hence, in some embodiments, the verifying whether or not the L2/L3 message originated in the first wireless device 131 may be further based on a third result of determining, in Action 401_3, whether or not the L2/L3 message comprises a contention resolution identity for the second wireless device 132, that is, a wireless device other than the first wireless device 131. If the message originated from some other wireless device, e.g., the second wireless device 132, it may contain the UE contention resolution identity, either a Common Control CHannel (CCCH) message, or a C-RNTI Medium Access Control (MAC) Control Element (CE), which is not case if the message originated from the first wireless device 131, namely, the UE receiving the PDCCH order.

In some embodiments, the network node 110 may determine that the L2/L3 message originated in the second wireless device 132. The network node 110 may then proceed with a random access procedure for the second wireless device 132.

Decoding may be attempted in parallel or, e.g., by successive decoding, decoding first one and then the other.

In some examples, the network node 110 may be a radio network node, e.g., an eNB. In such examples, the network node 110 may itself have received the L2/L3 message from the wireless device 131 or another wireless device, such as the second wireless device 132, and sent the first PDCCH order to the first wireless device 131. In other examples, the network node 110 may be a distributed node in e.g., the cloud, performing the determining in this Action 401. In such examples, the L2/L3 message may have been received, and the first PDCCH order may have been sent to the first wireless device 131, by a radio network node connected to the network node 110. The network node 110 may then have obtained the L2/L3 message from the radio network node.

Action 402

If decoding of the L2/L3 message in Action 401 fails, the network node 110, in this Action 402, before declaring the random access procedure a failure, may try again to decode the message. The network node 110 may therefore request a retransmission, from the first wireless device 131, of the L2/L3 message. The retransmission may be, e.g., a Hybrid Automatic Repeat reQuest (HARQ) retransmission. In some embodiments, the network node 110 may request the retransmission, based on the first result of any of the one or more attempts to decode the L2/L3 message using the C-RNTI being a failure. As schematically depicted in FIG. 4, the requesting of the retransmission may be performed if the attempt to decode the L2/L3 message is a failure in any of Action 401_1, 401_2, or 401_3.

In some embodiments, the requesting in this Action 402 of the retransmission may be repeated for a maximum number of the one or more attempts. Typically, the network node 110 may continue to request re-transmissions until the maximum number of HARQ re-transmissions is reached.

In some examples, the network node 110 may determine that the random access procedure for the first wireless device 131 has failed, after determining that the one or more attempts to decode the L2/L3 message using the C-RNTI have failed the maximum number of the one or more attempts.

In some embodiments, the network node 110 may further request the retransmission of the L2/L3 message, from the second wireless device 132, or from the first wireless device 131 and the second wireless device 132, based on the first result of any of the one or more attempts to decode the L2/L3 message using the C-RNTI being a failure. The second wireless device 132 may be a wireless device 132 operating in the wireless communications network 100, using the same non-reserved signal, e.g., preamble, tone or subcarrier, used by the first wireless device 131.

In some embodiments, the requesting of the retransmission in this Action 402 may be for the first wireless device 131 and the second wireless device 132, and the retransmission may be scheduled by the network node 110 in one of: a same time-frequency resources, and different time-frequency resources.

Alternatively, the network node 110 may schedule the retransmission, e.g., repeated HARQ retransmissions, for the first wireless device 131 and the second wireless device 132, on the same resources, and try to decode both in a repetition of Action 401. Because the first wireless device 131 and the second wireless device 132 may use different Radio Network Temporary Identifiers (RNTIs), e.g., C-RNTI and Temporary C-RNTI, respectively, the first wireless device 131 and the second wireless device 132 may be scheduled separately or independently.

Action 403

If the network node 110 is not able to decode the L2/L3 message after the maximum number of HARQ re-transmissions is reached, the random access procedure may be declared failed for the first wireless device 131. This may either be due to a preamble collision, which in turn caused e.g., the timing advance to be set incorrectly for the first wireless device 131, or due to poor radio link conditions. If the network node 110 suspects that the transmission failed due to a collision, it may request the first wireless device 131 to perform another random access attempt by issuing another PDCCH order. In other words, the network node 110 may determine that it may need to start over the random access procedure.

In some embodiments, after the network node 110 may determine that the random access procedure for the first wireless device 131 has failed the maximum number of the one or more attempts, the network node 110, in this Action 403, sends a second PDCCH order to the first wireless device 131.

Sending may comprise initiating transmission, that is, triggering transmission or transmitting itself. The sending may be performed e.g., via the first radio link 141.

The second PDCCH order may be understood as another PDCCH order, e.g., a new PDCCH order, or an additional PDCCH order.

In some embodiments, wherein Action 401_2 may have been performed, the network node 110 may determine that the L2/L3 message did not originate in the first wireless device 131, based on the second result of the attempt to decode the L2/L3 message using the Temporary C-RNTI being successful. In such embodiments, the network node 110 may send the second PDCCH order to the first wireless device 131, wherein the second PDCCH may be sent before performing the maximum number of the one or more attempts. That is, the network node 110 may issue another PDCCH order directly, instead of waiting until the maximum number of HARQ re-transmissions has been reached.

In some embodiments wherein Action 401_3 may have been performed, the network node 110 may send the second PDCCH order to the first wireless device 131, after the third result is that the random access procedure for the first wireless device 131 has failed, based on the determining in Action 402_2 that the L2/L3 message comprises the contention resolution identity for the second wireless device 132.

Embodiments herein allow certain advantages. As mentioned earlier, the contention free random access procedure may be faster than the contention based random access procedure and may therefore be generally preferred for UEs in RRC_CONNECTED mode. The number of random access preambles is limited and reserving preambles for contention-free random access may therefore not always be possible or desired, since it would steal capacity from the contention based random access. One advantage of embodiments herein is that they enable the contention-free random access procedure to be used, even when no reserved preambles are available. The contention-free random access procedure may no longer be contention-free, since collisions may occur when a non-reserved preamble is indicated in the PDCCH order. However, as long as collisions are rare, the procedure will in most cases still be faster than the contention based random access procedure, since a wireless device may not need to perform the additional two steps of the contention resolution phase. That is, one roundtrip in the random access procedure may be saved, compared to the contention based random access procedure, and latency is thereby reduced.

A non-limiting particular example of the method performed by the network node 110 will now be described. In the following description, any reference to a/the UE_A is understood to equally refer to the first wireless device 131. Any reference herein to a/the UE_B is understood to equally refer to the second wireless device 132, and any reference to a/the eNB is understood to refer to the network node 110. In this particular example, the signal is a preamble.

Figure 5:
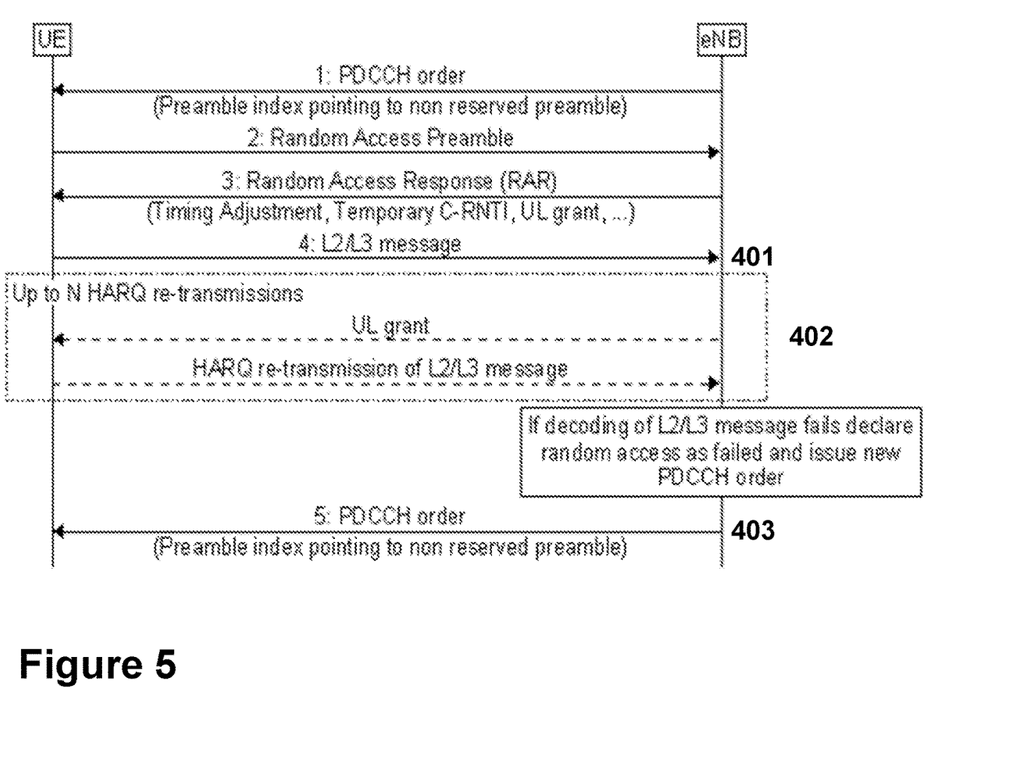
FIG. 5 shows a flowchart illustrating an example of embodiments of a method in a network node, according to embodiments herein.

The method described herein for detecting and resolving preamble collisions may be implemented in the eNB. A description of the actions performed by the eNB in a non-limiting particular example of embodiments herein is provided below, using the signaling diagram in FIG. 5 as a reference. FIG. 5 shows the random access procedure when a non-reserved preamble is indicated in the Narrowband PDCCH (NPDCCH) order. The eNB may use the L2/L3 message transmitted on the PUSCH to determine if the random access attempt is successful, or if a collision occurred, as described earlier for Action 401. The description below is for NB-IoT but the method may also be applied for, e.g., LTE.

1. The eNB sends a PDCCH order to UE_A, where the preamble index points to one of the non-reserved preambles, that is, a preamble from the set of contention based preambles.

2. The eNB monitors the RACH, and receives the preamble indicated in the PDCCH order. In general, the eNB may not be able to determine if the preamble in the transmission originated from UE_A, since another UE, UE_B, performing contention based random access may have selected the same preamble as the one indicated in the PDCCH order.

3. The eNB responds with a Random Access Response (RAR) comprising:

a. The index of the random-access preamble the network detected and for which the response is valid.

b. The Timing Advance (TA) calculated by the random-access preamble receiver and which is used for uplink synchronization c. A scheduling grant, indicating resources the UE may use for the transmission of the L2/L3 message in the third step.

d. A temporary identity, the Temporary C-RNTI.

4. The eNB receives the L2/L3 message on the PUSCH and attempts to decode the transmission using the C-RNTI of UE_A, as described above for Action 401_1. If the decoding is successful, that is, if the message passes the Cyclic Redundancy Check (CRC) checksum verification, the eNB, as described above as part of Action 401, concludes that the message originated from UE_A and that the random access attempt was successful.

If decoding fails, the eNB may request the L2/L3 message to be re-transmitted by scheduling additional HARQ re-transmission, as described above for Action 402. In this case, the uplink grant for the re-transmission is indicated on PDCCH using the C-RNTI of UE_A. Typically, the eNB may continue to request re-transmissions until a maximum number of HARQ re-transmissions is reached. The eNB may also, as part of this estimate, determine if there is any energy transmitted on the UL/NPUSCH resource to determine how many HARQ re-transmissions should be scheduled before going to step 5.

5. If the eNB is not able to decode the L2/L3 message after the maximum number of HARQ re-transmissions is reached, the random access is declared failed for UE_A. This may either be due to a preamble collision, which in turn caused e.g., the timing advance to be set incorrectly for UE_A, or due to poor radio link conditions. If the eNB suspects that the transmission failed due to a collision, it may request the UE to perform another random access attempt by issuing another PDCCH order, as described above for Action 403.

The eNB may also try to simultaneously decode the L2/L3 message using the Temporary C-RNTI indicated in the RAR message, as described earlier for Action 401_2. If the message is scrambled with the Temporary C-RNTI, it means the message originated from UE_B and that a preamble collision occurred. The eNB may then declare random access failure for UE_A directly and issue another PDCCH order directly, as per Action 403, instead of waiting until the maximum number of HARQ re-transmissions has been reached.

Alternatively to Actions 401_1 and 401_2, instead of using the scrambling sequence to determine which UE msg3 originated from, the eNB may look at the contents of the L2/L3 message, as described earlier in Action 401_3. If the message originated from some other UE, e.g., the second wireless device 132, it may contain the UE contention resolution identity, either a Common Control CHannel (CCCH) message as in scenario 1-2 above, or the C-RNTI Medium Access Control (MAC) Control Element (CE) as in scenario 3-4, which is not case if the message originated from the UE receiving the PDCCH order.

When detecting that message originated from UE_B, the eNB may also serve/proceed with the random access of UE_B.

When detecting or suspecting that there is a collision, the eNB may under some circumstances serve/proceed with the random access procedures of both UE_A and UE_B. The eNB may schedule HARQ retransmissions of UE_A and UE_B on different resources; that is, it may direct UE_A and UE_B to retransmit on different resources. Alternatively, the eNB may schedule HARQ retransmissions of UE_A and UE_B on the same resources and try to decode both. Because UE_A and UE_B may use different RNTIs, e.g., C-RNTI and Temporary C-RNTI, respectively, UE_A and UE_B may be scheduled separately or independently.

Decoding may be attempted in parallel or, e.g., by successive decoding, decoding first one and then the other.

To summarize the foregoing, embodiments described herein provide an approach for detecting and resolving preamble collisions resulting from the use of a non-reserved preamble in a PDCCH order. According to embodiments herein, the L2/L3 message may be used to detect if random access is successful after a PDCCH order is sent to a UE, or if a preamble collision occurred. A collision may occur if another UE, e.g., the second wireless device 132, performs contention based random access at the same time and selects the same preamble as the one indicated in the PDCCH order. The eNB may detect if random access is successful, and that the UE is uplink synchronized by verifying that msg3 originated from the correct UE, that is, the UE receiving the PDCCH order, e.g., the first wireless device 131. If the random access was unsuccessful, the eNB may request the UE to try again by issuing another PDCCH order.

The eNB may detect if an L2/L3 message originated from the correct UE based on the scrambling sequence used to decode the message. If the message originated from the UE receiving the PDCCH order, it may be scrambled with the UE's C-RNTI. Otherwise it may be scrambled with the Temporary C-RNTI indicated in the RAR message.

Figure 6:
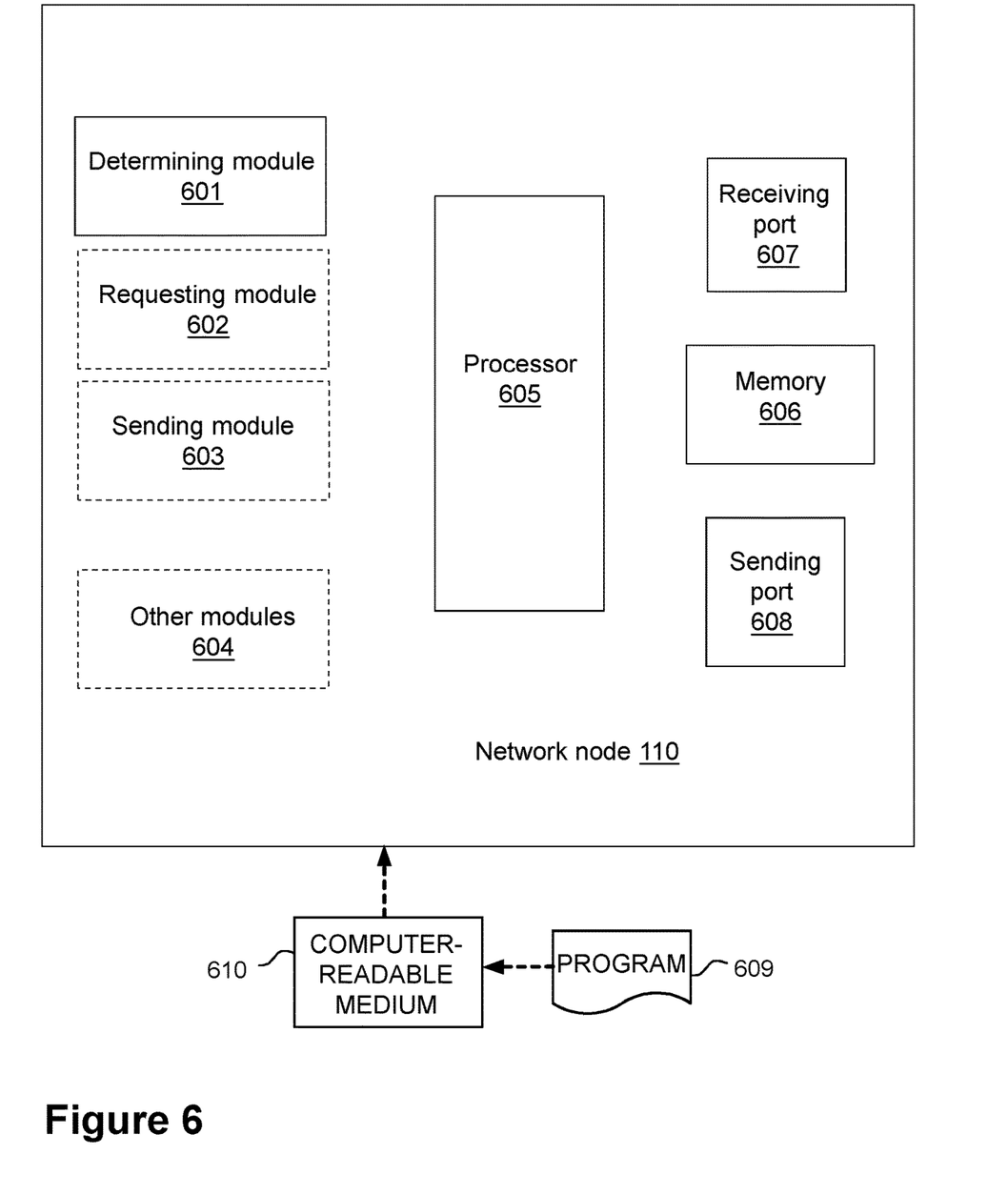
FIG. 6 is a schematic block diagram illustrating embodiments of a network node, according to embodiments herein.

To perform the method actions described above in relation to FIG. 4 and FIG. 5, the network node 110 may comprise the following arrangement depicted in FIG. 6. The network node 110 is configured to be in communication with the first wireless device 131. The network node 110 and the first wireless device 131 being configured to operate in the wireless communications network 100.

The detailed description of some of the following corresponds to the same references provided above, in relation to the actions described for the network node 110, and will thus not be repeated here. For example, the random access may be understood as, e.g., the random access procedure in LTE.

The network node 110 is further configured to, e.g. by means of a determining module 601 within the network node 110 configured to, determine whether or not the random access procedure for the first wireless device 131 was successful. To determine is configured to be performed after the following actions in the random access procedure: a) the first PDCCH order indicating the non-reserved signal has been sent to the first wireless device 131, the signal being one of: the preamble, the tone and the subcarrier, and b) the L2/L3 message has been received after the sending of the first PDCCH order. To determine is configured to be based on verifying whether or not the L2/L3 message originated in the first wireless device 131. The determining module 601 may be a processor 605 of the network node 110, or an application running on such processor.

In some embodiments, the verifying whether or not the L2/L3 message originated in the first wireless device 131 is configured to be based on the first result of attempting 402_1 to decode, for one or more attempts, the L2/L3 message using the C-RNTI, the C-RNTI being configured to have been assigned to the first wireless device 131 prior to the first PDCCH order having been sent.

The network node 110 may be configured to, e.g. by means of a requesting module 602 within the network node 110 configured to, request the retransmission, from the first wireless device 131, of the L2/L3 message, based on the first result of any of the one or more attempts to decode the L2/L3 message using the C-RNTI being a failure.

In some embodiments, to request the retransmission may be configured to be repeated for the maximum number of the one or more attempts.

The network node 110 may be configured to determine that the random access procedure for the first wireless device 131 has failed, after determining that the one or more attempts to decode the L2/L3 message using the C-RNTI have failed the maximum number of the one or more attempts.

In some embodiments, the verifying whether or not the L2/L3 message originated in the first wireless device 131 may be further configured to be based on the second result of attempting 401_2 to decode the L2/L3 message using the Temporary C-RNTI indicated by the network node 110 to the first wireless device 131 in response to receiving the signal from the first wireless device 131.

Expressed differently, the verifying whether or not the L2/L3 message originated in the first wireless device 131 may be further based on a second result of attempting 401_2 to decode the L2/L3 message using a Temporary C-RNTI indicated by the network node 110 to the first wireless device 131 in response to receiving a random access signal from the first wireless device 131, the random access signal being based on the indicated signal. The random access signal may be one of: a random access preamble, a random access tone, and a random access subcarrier.

In some embodiments, the network node 110 may be further configured to, e.g. by means of a sending module 603 within the network node 110 configured to, send the second PDCCH order to the first wireless device 131. The sending module 603 may be the processor 605 of the network node 110, or an application running on such processor.

In some embodiments, the network node 110 may be further configured to send the second PDCCH order to the first wireless device 131, after the network node 110 determines that the random access procedure for the first wireless device 131 has failed the maximum number of the one or more attempts.

In some embodiments, the network node 110 may be further configured to send the second PDCCH order to the first wireless device 131, the network node 110, wherein the network node 110 determines that the L2/L3 message did not originate in the first wireless device 131, based on the second result of the attempt to decode the L2/L3 message using the Temporary C-RNTI being successful, and wherein the second PDCCH may be configured to be sent before performing a maximum number of the one or more attempts.

In some embodiments, the verifying whether or not the L2/L3 message originated in the first wireless device 131 may be further configured to be based on the third result of determining 401_3 whether or not the L2/L3 message comprises the contention resolution identity for the second wireless device 132. The second wireless device 132 may be operating in the wireless communications network 100.

In some embodiments, the network node 110 may be further configured to: send the second PDCCH order to the first wireless device 131, after the third result is that the random access procedure for the first wireless device 131 has failed, based on determining 402_2 that the L2/L3 message comprises the contention resolution identity for the second wireless device 132.

The network node 110 may be an eNB and each of the first wireless device 131 and the second wireless device 132 may be a different UE.

Other modules 604 may be comprised in the network node 110.

The embodiments herein may be implemented through one or more processors, such as a processor 605 in the network node 110 depicted in FIG. 6, together with computer program code for performing the functions and actions of the embodiments herein. A processor may be understood herein as a hardware component, that is, a processing circuitry. Hence, the processor 604 may also be referred to as a processing circuitry 604. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 606 comprising one or more memory units. The memory 606 is arranged to be used to store obtained information, store data, configurations, schedulings, and applications etc. to perform the methods herein when being executed in the network node 110.

In some embodiments, the network node 110 may receive information from the first wireless device 131, the second wireless device 132, or both, through a receiving port 607. In some embodiments, the receiving port 607 may be, for example, connected to one or more antennas in network node 110. In other embodiments, the network node 110 may receive information from another structure in the wireless communications network 100 through the receiving port 607. Since the receiving port 607 may be in communication with the processor 605, the receiving port 607 may then send the received information to the processor 605. The receiving port 607 may also be configured to receive other information.

The processor 605 in the network node 110 may be further configured to transmit or send information to e.g., any of the first wireless device 131 and the second wireless device 132, through a sending port 608, which may be in communication with the processor 605, and the memory 606.

The network node 110 may comprise an interface unit to facilitate communications between the network node 110 and other nodes or devices, e.g., any of the first wireless device 131 and the second wireless device 132. The interface may, for example, include a transceiver configured to transmit and receive radio signals over an air interface in accordance with a suitable standard.

Those skilled in the art will also appreciate that the determining module 601, the requesting module 602, the sending module 603, and the other modules 604 described above may refer to a combination of analog and digital modules, and/or one or more processors configured with software and/or firmware, e.g., stored in memory, that, when executed by the one or more processors such as the processor 605, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 601-604 described above may be implemented as one or more applications running on one or more processors such as the processor 605.

Thus, the methods according to the embodiments described herein for the network node 110 may be respectively implemented by means of a computer program 609 product, comprising instructions, i.e., software code portions, which, when executed on at least one processor 605, cause the at least one processor 605 to carry out the actions described herein, as performed by the network node 110. The computer program 609 product may be stored on a computer-readable storage medium 610. The computer-readable storage medium 610, having stored thereon the computer program 609, may comprise instructions which, when executed on at least one processor 605, cause the at least one processor 605 to carry out the actions described herein, as performed by the network node 110. In some embodiments, the computer-readable storage medium 610 may be a non-transitory computer-readable storage medium, such as a CD ROM disc, a memory stick, or stored in the cloud space. In other embodiments, the computer program 609 product may be stored on a carrier containing the computer program, wherein the carrier is one of an electronic signal, optical signal, radio signal, or the computer-readable storage medium 610, as described above.

When using the word "comprise" or "comprising", it shall be interpreted as non-limiting, i.e. meaning "consist at least of".

Embodiments herein may relate to Machine-Type Communications (MTC), enhanced MTC (eMTC), Narrowband Internet of Things (NB-IoT), LTE, eMTC, and eDRX.

The embodiments herein are not limited to the above described preferred embodiments. Various alternatives, modifications and equivalents may be used. Therefore, the above embodiments should not be taken as limiting the scope of the invention.

References to concepts herein may be found in TS 36.321 MAC specification, V14.0.0., TS 36.331 RRC specification, V14.0.0., and TS 36.213 E-UTRA Physical Layer Procedures, V14.0.0.

The invention claimed is:

1. A method performed by a network node in communication with a first wireless device, the network node and the first wireless device operating in a wireless communications network, the method comprising:
    determining a random access procedure for the first wireless device was not successful, the determining being performed after the network node transmits a first Physical Downlink Control Channel (PDCCH) order indicating a non-reserved signal comprising one of a preamble, a tone, and a subcarrier has been sent to the first wireless device and
    the network node receives a Layer 2/Layer 3 (L2/L3) message after the network node sends the first PDCCH order,
    wherein the determining is based on verifying that the L2/L3 message did not originate in the first wireless device, wherein the verifying that the L2/L3 message did not originate in the first wireless device is based on at least one of:
    failing to decode the L2/L3 message using a Cell Radio Network Temporary Identifier (C-RNTI), the C-RNTI having been assigned to the first wireless device prior to the first PDCCH order having been sent, requesting a retransmission, from the first wireless device, of the L2/L3 message, based on failing to decode the L2/L3 message using the C-RNTI, repeating requesting the retransmission for a maximum number of failed attempts to decode the L2/L3 message using the C-RNTI,
    successfully decoding the L2/L3 message using a Temporary C-RNTI indicated by the network node to the first wireless device in response to receiving the non-reserved signal from the first wireless device,
    determining the L2/L3 message comprises a contention resolution identity for a second wireless device, and
    sending a second PDCCH order to the first wireless device responsive to determining the random access procedure for the first wireless device was unsuccessful.

2. The method according to claim 1, wherein determining that the random access procedure for the first wireless device has failed comprises determining that a number of failed attempts to decode the L2/L3 message using the C-RNTI meet the maximum number of failed attempts.

3. The method according to claim 2, wherein determining the random access procedure was not successful comprises determining that the random access procedure for the first wireless device has failed the maximum number of the failed attempts.

4. The method according to claim 1, wherein determining that the L2/L3 message did not originate in the first wireless device successfully decoding the L2/L3 message using the Temporary C-RNTI, and wherein sending the second PDCCH order to the first wireless device comprises sending the second PDCCH before performing a maximum number of failed attempts to decode the L2/L3 message using the C-RNTI.

5. The method according to claim 1, wherein determining that the random access procedure for the first wireless device has failed comprises determining that the L2/L3 message comprises the contention resolution identity for the second wireless device.

6. A computer program product comprised on a non-transitory computer-readable medium, comprising instructions which, when executed on at least one processor of a network node in communication with a first wireless device, the network node and the first wireless device operating in a wireless communications network, cause the at least one processor to perform operations comprising:
    determining a random access procedure for the first wireless device was not successful, the determining being performed after the network node transmits a first Physical Downlink Control Channel (PDCCH) order indicating a non-reserved signal comprising one of a preamble, a tone, and a subcarrier has been sent to the first wireless device and
    the network node receives a Layer 2/Layer 3 (L2/L3) message after the network node sends the first PDCCH order,
    wherein the determining is based on verifying that the L2/L3 message did not originate in the first wireless device, wherein the verifying that the L2/L3 message did not originate in the first wireless device is based on at least one of:

failing to decode the L2/L3 message using a Cell Radio Network Temporary Identifier (C-RNTI), the C-RNTI having been assigned to the first wireless device prior to the first PDCCH order having been sent, successfully decoding the L2/L3 message using a Temporary C-RNTI indicated by the network node to the first wireless device in response to receiving the non-reserved signal from the first wireless device, determining the L2/L3 message comprises a contention resolution identity for a second wireless device, and sending a second PDCCH order to the first wireless device responsive to determining the random access procedure for the first wireless device was unsuccessful and determining the network node has failed the maximum number of failed attempts to decode the L2/L3 message using the C-RNTI, wherein determining the random access procedure for the first wireless device was not successful comprises determining that network node has failed a maximum number of failed attempts to decode the L2/L3 message using the C-RNTI.

7. A network node configured to be in communication with a first wireless device, the network node and the first wireless device being configured to operate in a wireless communications network, the network node being further configured to:

determine a random access procedure for the first wireless device was not successful, the determining being performed after the network node transmits a first Physical Downlink Control Channel (PDCCH) order indicating a non-reserved signal comprising one of a preamble, a tone, and a subcarrier has been sent to the first wireless device and the network node receives a Layer 2/Layer 3 (L2/L3) message after the network node sends the first PDCCH order, wherein the the determination is based on verifying that the L2/L3 message did not originate in the first wireless device, wherein the verifying that the L2/L3 message did not originate in the first wireless device is based on at least one of:

failing to decode the L2/L3 message using a Cell Radio Network Temporary Identifier (C-RNTI), the C-RNTI having been assigned to the first wireless device prior to the first PDCCH order having been sent, successfully decoding the L2/L3 message using a Temporary C-RNTI indicated by the network node to the first wireless device in response to receiving the non-reserved signal from the first wireless device, determining the L2/L3 message comprises a contention resolution identity for a second wireless device, and send a second PDCCH order to the first wireless device responsive to the determination that the random access procedure for the first wireless device was unsuccessful;

wherein the network node is further configured to determine the random access procedure for the first wireless device was not successful by determining the network node has failed a maximum number of failed attempts to decode the L2/L3 message using the C-RNTI; and wherein the network node is further configured to send the second PDCCH order to the first wireless device responsive to determining that network node has failed the maximum number of failed attempts to decode the L2/L3 message using the C-RNTI.

8. The network node according to claim 7, being further configured to:

request a retransmission, from the first wireless device, of the L2/L3 message, based on failing to decode the L2/L3 message using the C-RNTI.

9. The network node according to claim 8, wherein to request the retransmission is configured to be repeated for a maximum number of failed attempts to decode the L2/L3 message using the C-RNTI.

10. The network node according to claim 9, wherein the network node is configured to determine that the random access procedure for the first wireless device has failed based on a determination that a number of failed attempts to decode the L2/L3 message using the C-RNTI meet the maximum number of failed attempts.

11. The network node according to claim 10, wherein the network node is further configured to determine that the random access procedure was not successful based on a determination that the random access procedure for the first wireless device has failed the maximum number of failed attempts.

12. The network node according to claim 7, wherein the network node is further configured to determine that the L2/L3 message did not originate in the first wireless device based on a determination that the network node successfully decoded the L2/L3 message using the Temporary C-RNTI, and wherein the network node is further configured to send a second PDCCH order to the first wireless device before performing a maximum number of failed attempts to decode the L2/L3 message using the C-RNTI responsive to the determination that the network node successfully decoded the L2/L3 message using the Temporary C-RNTI.

13. The network node according to claim 7, wherein the network node is further configured to determine that the random access procedure for the first wireless device has failed based on a determination that the L2/L3 message comprises the contention resolution identity for the second wireless device.

* * * * *